2,789,149

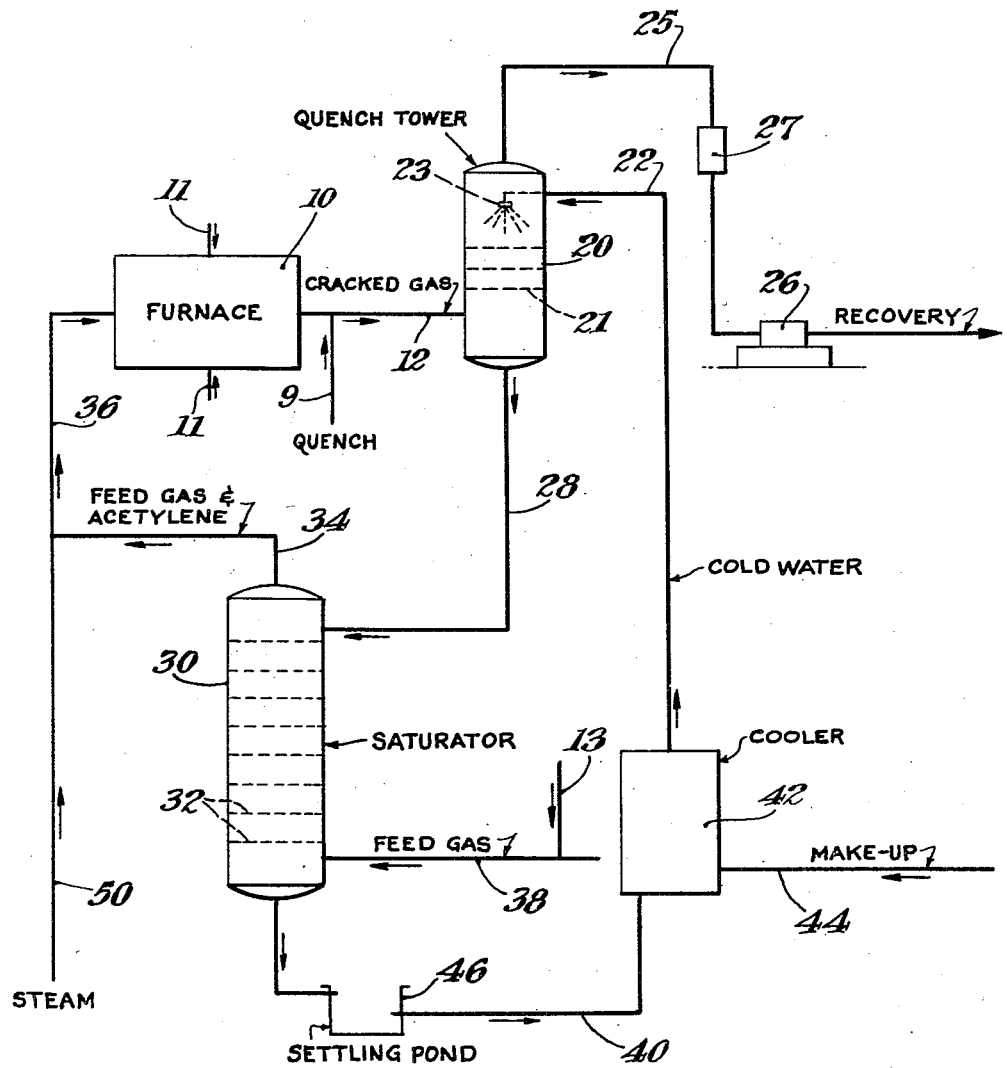

ACETYLENE PRODUCTION

Marcel J. P. Bogart, Mamaroneck, and Valentine Mekler and Hyman R. Davis, Jackson Heights, N. Y., assignors to The Lummus Company, New York, N. Y., a corporation of Delaware Application March 24, 1954, Serial No. 418,256

4 Claims. (Cl. 260—679)

This invention relates to the manufacture of acetylene from hydrocarbons by high temperature cracking, and more particularly relates to an improved method of carrying out the quenching of acetylene containing cracked gas to provide improved heat recovery, increased recovery of acetylene and reduction in feed dilution steam requirements.

The recent increased demand for commercial acetylene has caused a great deal of emphasis to be placed on more efficient methods of producing and recovering acetylene. In the older commercial method of manufacture of acetylene, water and calcium carbide were reacted to produce an acetylene gas which was comparatively free of contaminating compounds. This method satisfied most commercial needs both for chemical and other purposes for many years. The growing importance of acetylene however, as one of the fundamental building blocks for the manufacture of a wide variety of chemical compounds, has focused attention on cheaper sources of acetylene and methods of more economical and efficient recovery.

In recent years, considerable effort has been directed to the production of acetylene by the high temperature cracking of hydrocarbons. The preferred hydrocarbons for such a cracking operation are the low molecular weight normally gaseous hydrocarbons such as methane, ethane and propane or mixtures of these such as are found in natural gas. In producing acetylene according to the high temperature cracking method, the hydrocarbon feed is charged to a furnace operated at temperatures above 2000° F. for a comparatively short period of time to produce a cracked gas containing acetylene in an amount varying from 5-15% of the cracked gas. In the regenerative furnace, the hot gas gives up heat to the cooler part of the furnace before withdrawal.

Normally such an effluent is withdrawn from the cracking furnace at a comparatively high temperature and passed through a series of quench towers or similar means for cooling the effluent from its exit temperature of approximately 900° F. down to a temperature of from 100 to 200° F., at which point proper acetylene separation and recovery steps can be carried out. The initial quench operation generally includes means for removing the heavier undesirable components such as tars, aromatic compounds such as benzene and naphthalene, and carbon particles from the effluent. These components of the effluent are generally removed in a so-called tar separator or trap from which they are withdrawn and passed to a sump. Thereafter the effluent substantially free of tar and still at a comparatively high temperature, is passed to a quench tower for cooling.

The quench operation is generally carried out with water and according to present commercial methods fails to utilize efficiently the heat absorbed by the quench liquid during the cooling. In addition, present quench systems fail to provide for the removal and recovery of the small percentage of acetylene which is absorbed in the quench liquid and heavy material during the quench operation.

Another aspect of the production of acetylene according to high temperature cracking methods is the consumption of substantial quantities of dilution steam to preheat the charge and reduce its partial pressure to permit cracking at lower temperatures. This dilution steam is supplied to the furnace or feed stream line from an outside source and when used in the normal ratio of from 1 to 10 volumes of steam per volume of feed becomes an important factor in the cost of acetylene production. It is apparent that a reduction in dilution steam requirements from an outside source would mean considerable saving in plant operating expense and a corresponding reduction in the market price of the acetylene.

Accordingly it is one of the primary objects of this invention to provide more efficient cracked gas quench operation with improved utilization of recovered heat and a reduction in feed gas dilution steam requirements from outside sources such as a steam generation plant.

It is another object of this invention to provide a simultaneous preheating of the feed gas and cooling of the quench liquid at reduced heating and cooling requirements.

It is still another object of this invention to remove acetylene present in quench liquid, and recover such acetylene to increase the overall recovery of acetylene.

These and other objects are accomplished by this invention which broadly includes the following steps: withdrawing a hot cracked gas containing acetylene from a cracking operation, introducing the cracked gas to a quench tower, quenching said gas with cold quench liquid thereby substantially reducing the temperature of said gas, withdrawing the cooled cracked gas after quenching and passing the same to further recovery means, withdrawing warm quench liquid containing some dissolved acetylene from the quench tower and introducing the same into a feed gas saturator, introducing feed gas into said saturator and therein contacting said feed gas with quench liquid to provide water saturation of said feed gas and withdrawing water-saturated feed gas and passing the saturated feed gas to a cracking furnace.

The method for carrying out this improved quench operation will be more completely described hereafter with reference to the attached drawing which shows one mode of carrying out this invention.

Referring now to the drawing, numeral 10 indicates a conventional cracking furnace, which may be of the regenerative type, such as the so-called Wulff furnace, into which a hydrocarbon feed is introduced. According to this invention the hydrocarbon feed 38, prior to introduction to the furnace, is passed through saturator 30 and combined with dilution steam provided in line 50. The quantity of dilution steam added to the feed varies from one to ten volumes of steam to one volume of feed. If desired the remainder of the dilution steam may be introduced directly into the furnace. As described hereafter the feed in line 34, prior to mixing with the steam from line 50, will contain a substantial portion of the required dilution steam provided by the contact of feed and quench liquid in saturator 30.

A recycle stream of cracked gas components separated in the acetylene operation which follows cracking and quenching may be provided by line 13. Furnace 10 is operated at less than atmospheric pressure, generally from 5 to 14 p. s. i. a., and in a cyclic manner, with alternate heating and cracking cycles. Furnace heat is supplied by a fuel gas introduced by lines 11.

After cracking, the product, normally referred to as the cracked gas or cracking effluent, exits the furnace through line 12 at a temperature of from about 600° F. to 900° F. In furnaces of a type other than the regenerative type, the effluent may be withdrawn at a considerably higher temperature. The hot cracked gas is removed through line 12 and passed to a quench tower 20, wherein a substantially instantaneous reduction in temperature is accomplished.

If desired, a preliminary quench 9 may be placed in line 12 to obtain removal of the heaviest of the contaminants prior to the passage of the effluent to the quench tower.

The composition of the effluent from a cracking operation varies with the type and characteristics of the feed gas as well as the conditions under which the cracking is carried out. A typical cracked gas would have the following composition:

| | |
|---|---|
| Hydrogen | 51.4 |
| Carbon monoxide | 8.3 |
| Carbon dioxide | 1.5 |
| Methane | 29.4 |
| Ethylene | 1.1 |
| Acetylene | 7.3 |
| Miscellaneous | 1.0 |
| | 100.0 |

The miscellaneous gas comprises such materials as methyl acetylene, vinyl acetylene, diacetylene, benzene, tars, aromatics and the like. Compounds such as methyl acetylene and diacetylene are removed in the conventional recovery system to which the effluent is passed after quench. The heavier undesirable components such as the tars and aromatics are removed in the quench operation, generally being withdrawn from the quench tower along with the quench liquid for transfer to a skimming pond or other suitable means for recovering such material from the quench liquid.

Tower 20 is a conventional countercurrent contact tower operated under a pressure of from about 5 p. s. i. a. to 15 p. s. i. a., and is provided with baffles 21 or other suitable means to insure substantially complete contact of the cracked gas and the quench liquid which is introduced by line 22 into the upper part of the tower 20. The manner of introduction is generally in the form of a spray as through nozzle 23 or other similar means to insure complete distribution of the quench liquid in the tower. Hereinafter, the quench liquid will normally be referred to as water.

The cracked gas, after contact with the quench liquid, which is normally introduced at a temperature of between approximately 70° F. and 100° F., is withdrawn from the top of the quench tower by way of line 25 and passed through final tar removal means 27 and into compressor 26. The effluent after quench is passed to further treatment in the conventional acetylene recovery system not shown wherein the acetylene is separated from other components present in the cracked gas. The quench water, having been raised in temperature by absorption of cracked gas heat to between 140° F. and 160° F., is withdrawn from tower 20 in line 28 and introduced into a feed gas saturator or stripper 30.

Saturator 30, similar to quench tower 20 is provided with baffles or trays 32 to insure intimate contact of the feed gas and quench water as they move countercurrently through the tower.

The heated quench water introduced into the upper part of saturator 30 contains a small percentage of acetylene which was absorbed in the quench operation. The acetylene present in the quench water after contact in column 20 varies in accordance with the temperature of the quench water and the quantity used, and may amount to as much as 2 to 3% of the total acetylene present in the cracked gas effluent.

Feed gas which may be any of the hydrocarbon gases or mixtures thereof previously mentioned, is introduced into stripper 30 by way of line 38 from a source not shown, generally at atmospheric temperature. If desired, however, the feed gas may be preheated prior to introduction into stripper 30. The feed gas moves upwardly in stripper 30 in countercurrent contact with the downwardly moving quench water.

This contact of feed gas and quench liquid produces several effects, the more important of which is the dilution of the feed gas by the water present in a manner that provides a substantial portion of the dilution normally accomplished only by the addition of considerable quantities of steam from an outside source such as is shown at 50. This substitution or saturation of the feed gas with hot quench water vapor is, in effect, a substitution of quench liquid for outside steam and provides reduction in outside steam requirements as much as 32.5% of the total volume of steam normally used for dilution purposes. The amount of dilution accomplished in saturator 30 will be controlled primarily by the temperature of the wet gas stream leaving the saturator 30.

The contact of the charge gas or feed with the quench water has another important function in that it strips absorbed acetylene from the quench water and carries the acetylene overhead by line 34 for return to the cracking furnace. After contact with the quench water, the feed gas and stripped acetylene along with the dilution vapor, are combined with dilution steam in line 36 and introduced into furnace 10.

It will be apparent that in the vaporization of quench water by the feed gas considerable cooling of the quench water will result. This partially cooled quench water is withdrawn from saturator 30 through line 40 and led to conventional cooler 42, a direct contact cooling tower or indirect contact heat exchanger. The cooling of quench liquid due to the vaporization of a portion of the liquid in saturator 30 is an added economy affected by the improved quench system since the cooler duty at 42 is substantially reduced.

In a commercial plant it is generally desirable to feed the water withdrawn from saturator 30 to a settling pond 46 to permit the removal of undesirable heavy material prior to passage of the quench water to final cooling means 42. Cooler 42 may be of any conventional construction such as a direct-contact cooling tower or indirect contact heat exchanger and provides cooling of the quench water to a temperature sufficient to effect the desired reduction in temperature of the cracked gas in tower 20. A quench water make-up line is provided at 44 to compensate water loss due to saturation of the feed stream and any other source of loss. This loss will be comparatively small with respect to the total volume of quench water circulated in the quench system. Other well known means of providing cooled water may of course be used.

The following example will further illustrate the nature of this invention, it being understood that the invention is not limited to the operating conditions or quantities therein:

Cracking charge:
   Compositions:

| | |
|---|---|
| Methane, $CH_4$ | 92.2 |
| Ethane, $C_2H_6$ | 4.7 |
| Propane, $C_3H_8$ | 1.4 |
| Butanes and Higher, $C_5H_{12}$ | 1.7 |
| | 100.0 |

125 S. C. F. M. of cracking charge and 254 S. C. F. M. of dilution steam were charged to a cracking furnace operated at 7.5 p. s. i. a. and 2218° F. (at the center of the furnace). 242 S. C. F. M. of cracked gas was produced (dry basis). Cracked gas withdrawn from the furnace at 752° F. was introduced to a quench tower to which 34.5 gallons/min. of quench water (temperature 90° F.) was delivered. Cracked gas was withdrawn from the quench tower at 110° F. and passed to the acetylene recovery system. Quench water at 162° F. withdrawn from the quench tower was passed to the saturator operated at 12 p. s. i. a. At a gas outlet temperature of 150° F. the amount of water vaporized in the saturator provided 22.4% of the dilution steam required by the charge gas.

The amount of dilution of feed gas obtained in the feed gas saturator will depend on the temperature at which the feed gas leaves the saturator. For example, if the feed gas leaves the saturator at a temperature of 140° F., approximately 15.8% of total steam dilution requirements will be obtained from the quench water. If the gas leaving the saturator has a temperature of 160° F., 32.5% of feed gas dilution will be obtained. According to the method described herein, using water as quench liquid, about 35% of the required dilution can be obtained.

It will be apparent that the novel saturation of feed gas with hot quench liquid has several important effects. In addition to dilution of the feed gas as described above, and the corresponding saving in outside steam requirements, the novel utilization of heat removed from cracked gases by the quench liquid to provide a water stream at a comparatively high temperature suitable for saturation of the feed gas, offers considerable advantage and saving in total heat requirements.

In addition to the economies provided in dilution steam requirements, passage of feed gas through the quench water has another very important effect. The stripping of absorbed acetylene from the quench tower eliminates the hazardous condition which exists when the acetylene absorbed in the quench water is permitted to remain in the quench water during the skimming and cooling operations which follow the quench operation. Further, the contact of the feed gas and quench liquid, in addition to recovering additional acetylene product by stripping and simultaneously cooling the quench liquid by evaporation of a portion of the quench liquid, provides preheat for the feed prior to its introduction into the cracking furnace.

The description herein generally relates to the production of acetylene and while this invention is particularly so adapated to the process, will work equally as well with other gaseous hydrocarbon feeds as well as heater effluents containing substantial quantities of unsaturated hydrocarbons such as ethylene, propylene, butylene and the like.

While a preferred embodiment of the invention has been described, it is to be understood that such description is merely illustrative of the underlying principles of the invention and is not intended as limiting the scope of the invention to the particular embodiment described.

We claim:

1. In the method of producing acetylene by the high temperature conversion of a gaseous hydrocarbon, the steps comprising introducing a high temperature cracked gas containing in addition to other components acetylene, higher acetylenes, tars and aromatics to a quench tower maintained at less than atmospheric pressure, contacting said gas with cold quench water therein so as to rapidly reduce the temperature of said gas from the furnace exit temperature to a temperature at which further acetylene recovery can be carried out, simultaneously absorbing a small portion of the acetylene content of said gas in the quench water and heavier components of the cracked gas, withdrawing a cooled gaseous overhead from said tower substantially free of tar and passing said overhead to further recovery steps, withdrawing quench water from said tower and introducing the same to the upper part of a feed gas saturator, said quench water having a temperature higher than that at which it was introduced to the quench tower and containing absorbed acetylene as well as substantially all the tar components of the cracked gas, passing a hydrocarbon feed gas into said feed gas saturator in contact with said quench water under conditions which vaporize a portion of said water and saturate said gas with the vaporized portion of said water, simultaneously stripping absorbed acetylene from the quench water and tar components, maintaining the contact of said gas and quench liquid for a time sufficient to provide a substantial portion of the high temperature conversion dilution vapor requirements, withdrawing a gaseous overhead from the feed gas saturator which includes feed gas, dilution vapor and stripped acetylene and passing said overhead to the high temperature cracking operation, removing quench water as a bottoms stream from said feed gas saturator, said bottom stream being substantially free of acetylene and including the tar components of the cracked gas, and having a temperature lower than the temperature at which it was introduced into the feed gas saturator.

2. In the method of producing acetylene by the high temperature cracking of a gaseous hydrocarbon feed as claimed in claim 1 wherein the bottom stream on withdrawal from the feed gas saturator is passed to a settling pond wherein the tar components are removed.

3. In the method of producing acetylene by the high temperature cracking of a gaseous hydrocarbon as claimed in claim 2, the additional steps comprising passing the quench water free of tar to further cooling and recycling the cooled quench water to the initial quench operation.

4. In the method of producing acetylene by the high temperature cracking of a gaseous hydrocarbon as claimed in claim 1, the additional steps of combining recycled off-gas from the acetylene recovery system with the feed gas entering the saturator for further high temperature cracking.

References Cited in the file of this patent

UNITED STATES PATENTS

| | | |
|---|---|---|
| 2,543,743 | Evans | Feb. 27, 1951 |
| 2,572,664 | Robinson | Oct. 23, 1951 |
| 2,666,734 | Findlay | Jan. 19, 1954 |
| 2,682,447 | Perry | June 29, 1954 |